Nov. 29, 1938.  W. D. WILCOX  2,138,249
PROCESS OF PRODUCING CARBON BLACK FROM HYDROCARBON GASES
Filed April 20, 1936
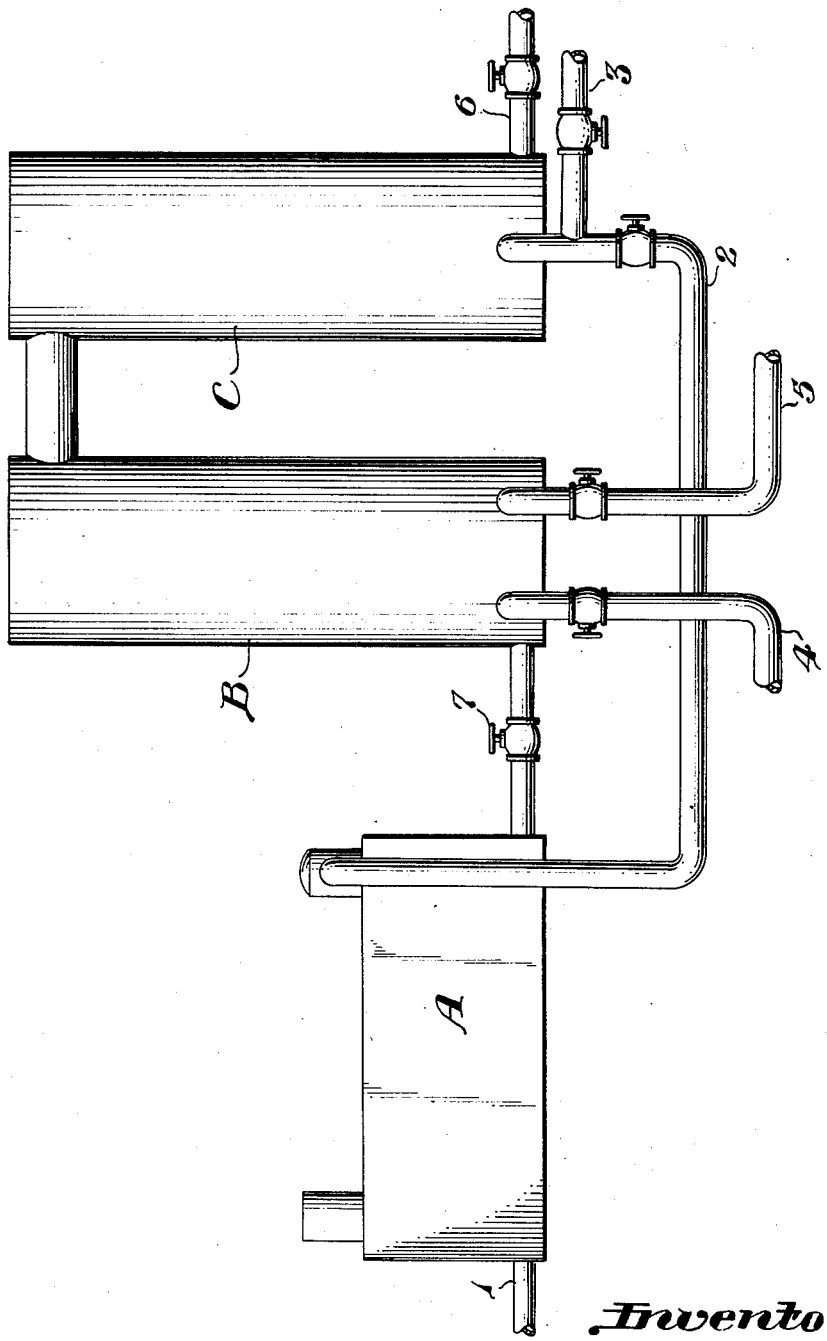
Inventor
Williams D Wilcox Patented Nov. 29, 1938

2,138,249

UNITED STATES PATENT OFFICE 2,138,249

PROCESS OF PRODUCING CARBON BLACK FROM HYDROCARBON GASES

William D. Wilcox, Pekin, Ill.

Application April 20, 1936, Serial No. 75,418

4 Claims. (Cl. 134—60)

In my U. S. Patent No. 1,918,362 of July 18, 1934, I disclose a process of obtaining carbon black together with a gas composed of oxides of carbon, hydrogen and nitrogen in controlled proportions, which can be readily made available for use in the synthesis of ammonia. Air in a volume less than sufficient to form an explosive mixture is added to a hydrocarbon gas and the mixture of air and hydrocarbons is passed through a refractory chamber, having a filling of refractory heat absorbing masses, prior heated to a dissociating temperature. The results in both quantity and quality of the carbon black evolved and recovered are gratifying. The carbon pigment is much darker in color and of smaller particle size than where the hydrocarbon gas is pyrolyzed without the addition of air. But there are uses for the residue gas in which the presence of nitrogen is highly undesirable.

A nearly pure hydrogen can be obtained by the reaction $CH_4$ plus heat equals C plus $2H_2$, but the carbon formed is of a grayish tint and of an undesirable particle size, making it much less useful.

I have found that, by adding a proportion of steam to the hydrocarbon gas prior to its pyrolysis, the quality of the carbon pigment recovered can be greatly improved and using a hydrocarbon gas which is free from nitrogen, a residue gas is obtained which can be converted to a pure hydrogen by well known means, and thus made suitable for such uses as the hydrogenation of oil.

I am aware that a patent has issued covering the pyrolysis of a hydrocarbon gas to which has been added double its volume of steam with carbon black listed as one of the products obtained. Given an adequate temperature and time of contact, one volume of methane ($CH_4$) to which has been added one volume of steam, will be completely dissociated according to the equation: $CH_4$ plus $H_2O$ plus heat, equals CO plus $3H_2$, no carbon being formed. The minimum temperature at which the reaction takes place appears to be lower than the temperature required to support the reaction $CH_4$ plus heat equals C plus $2H_2$. If the pyrolysis be continued till the dissociation of the hydrocarbons is substantially complete, the greater portion of the steam will also be decomposed.

Employing so large a proportion of steam to gas, the quantity of carbon recovered per unit volume of gas will, of necessity, by very small.

I find that better results are obtained by using a volume of steam relative to the hydrocarbon gas which, if entirely decomposed to oxygen and hydrogen, would not oxydize more than 80% of the carbon in the hydrocarbon gas to carbon monoxide.

In dealing with hydrocarbon gases having two or more carbon atoms in the molecule, a larger volume of steam may be added than in processing a gas predominantly methane. While I do not in carrying out my process, restrict myself except as above stated to any definite volumetric ratio, I employ a volume of steam about half that of the gas.

The reaction following subjection to an adequately dissociating temperature may be represented by the following equations: 100 $CH_4$ plus 50 $H_2O$ equals 50 C plus 50 CO plus 250 $H_2$. The concentration of the carbon in the carrying gas is only half that which exists when methane alone is pyrolyzed. As a result, there is a much less tendency of the particles of carbon, very minute as initially evolved, to combine by contact with others to form aggregates of an undesirable size. The quantity of carbon actually recovered is not reduced in as great a degree as might be expected from a study of the above equation. The dissociation of steam and union of the released oxygen with adjacent carbon takes place most actively at the heated surfaces within the dissociation chamber, where the temperature is at the maximum. It attacks predominantly the carbon which, by reason of adherence to these surfaces, is not in fact recovered in the operation of the dissociating process or which, if later swept into the gas stream, would through its having been coked into larger particles, reduce, by its presence, the value of the carbon recovered.

It further appears that the steam acts to reduce the particle size of carbon, which is not fully oxidized to carbon monoxide. While these particles are very minute, they are large in proportion to the atoms which are changing their relations, and can be partially oxidized quite as truly as a log of wood is partially burned. The heating which effects the results sought may be carried out in plant varying greatly in the details of construction and operation. The gas steam mixture may be dissociated by passage through externally heated conduits. I prefer to carry out the process in the form of plant covered by my U. S. Patent No. 1,916,545, of July 4, 1933. This consists of two chambers filled preferably with a multiplicity of refractory walled flues, all the exposed surfaces of which are substantially parallel with the general direction of gas flow. These chambers are cross-connected at their upper extremities. An active combustion is periodically maintained in one called the dissociation chamber. The combustion gases pass through this chamber, thence through the second chamber, known as the preheating chamber, in which a temperature less than that necessary to dissociation is created. From the base of this chamber, the combustion gases are passed through a recuperator to preheat the air which supports combustion. By this use of preheated air, I am able to restore the temperature of the dissociation chamber more quickly and attain a higher reaction temperature than would otherwise be possible.

The temperature of the interior of B produced by the passage of hot combustion gases from C during the reheating cycle will, in general, be less than that at which a material dissociation to carbon and hydrogen takes place, from 1200° F in the base to from 1800 to 2200° F at the top. The temperature in the interior of C, following the reheating cycle will be adequate to effect a substantially complete dissociation to carbon and hydrogen, from around 2000° F or more at the top to 2500° F or higher in the zone of active combustion in the base of C.

The gases to be pyrolyzed are admitted to the base of the preheating chamber and pass through it and down through the dissociating chamber to an outlet in the base, being in travel brought progressively in contact with more highly heated surfaces. By using silica carbide brick in the zone of maximum temperature and employing preheated air to support combustion in the heating cycle of operation, I am able to effect the degree of dissociation sought in a shorter interval of time, thus increasing plant capacity and, by the maintenance of a relatively high velocity, bettering the rate of heat transfer, minimizing the loss of carbon black by adherence to the walls and reducing the time during which the small particles of carbon are subjected to a temperature at which they can unite forming larger aggregates. Where a specially minute size is desired, the volume of steam added may be increased to the maximum of 80 to 100 of gas. Assuming a complete dissociation, which is very seldom realized, in full, what takes place will be represented by the following equation: 100 $CH_4$ plus 80 $H_2O$ plus heat equals 20 C plus 80 CO plus 280 $H_2$.

The volume of carrying gas relative to carbon is greatly increased and this joined with other conditions favorable to the elimination of the larger aggregates, results in a very superior quality of pigment. Whether or not this method be employed rather than others found to be effective, will be largely determined by the use to which it is proposed to put the residue gas. Unless there be nitrogen in the gas treated, the product will be free from nitrogen and usable for purposes in which the presence of nitrogen is not desired.

The quality of the carbon may be improved without so large an addition of steam as seriously reduces the recovery, by diluting the hydrocarbon with a neutral gas which does not contain any material proportion of hydrocarbon gas, which does not evolve carbon, or by operating under a pressure less than atmospheric by means of an exhauster on the gas outlet.

What I claim as new and desire to protect by the issuance to me of Letters Patent is:

1. The process of obtaining an improved quality of carbon black by the dissociation of hydrocarbon gases and vapors, which comprises heating the interior of a refractory walled chamber having a filling of refractory heat absorbing masses to a dissociating temperature by burning fuel gas within the interior of the chamber, passing the hot combustion gases through a preheating chamber and heating its interior to a temperature less than effects a material dissociation, and thence through a heat exchanger, simultaneously passing air through the heat exchanger and employing it to support the combustion of the fuel gas within the dissociating chamber, then passing hydrocarbon gases, to which has been added steam in a volume no more than sufficient, if dissociated, to oxidize 80% of the carbon in the hydrocarbon gas to carbon monoxide through the preheating chamber and thence through the dissociation chamber, in a direction of travel counter-current to the prior travel of the heating gases, withdrawing the pyrolyzed gas and recovering the entrained carbon.

2. The process of obtaining an improved quality of carbon black by the dissociation of hydrocarbon gases and vapors which comprises heating the interior of a refractory walled chamber filled with a multiplicity of refractory walled flues to a temperature such as will effect a substantially complete dissociation of hydrocarbon gases to carbon and hydrogen by the burning of fuel gas within the interior of the chamber, passing the combustion gases through a refractory walled preheating chamber and bringing its interior to a temperature less than sufficient to effect any substantial dissociation, thence through a heat exchanger, simultaneously passing air through the heat exchanger and employing it to support the combustion of the fuel gas within the dissociation chamber; then passing hydrocarbon gases together with steam in a volume less than sufficient, if completely dissociated, to oxidize more than 80% of the carbon of the hydrocarbon gas to carbon monoxide, through the preheating chamber and thence through the dissociation chamber in a direction of travel counter-current to the prior travel of the heating gases, withdrawing the pyrolyzed gas from the base of the dissociation chamber, and recovering the carbon entrained in the gas.

3. The process of obtaining an improved quality of carbon black by the dissociation of hydrocarbon gases and vapors, which comprises heating the interior of a refractory walled chamber having a filling of refractory heat absorbing masses to a temperature such as will effect a substantially complete dissociation of hydrocarbon gases to carbon and hydrogen by burning fuel gas within the interior of the chamber, passing the combustion gas through a preheating chamber and bringing its interior to a temperature less than sufficient to effect any substantial dissociation, and thence through a heat exchanger; simultaneously passing air through the heat exchanger and employing it to support the combustion of the fuel gas in the interior of the dissociation chamber; then passing through the preheating chamber and thence through the dissociation chamber, a volume of hydrocarbon gas together with a volume of steam less than sufficient, if completely dissociated, to oxidize more than 80% of the carbon in the hydrocarbon gas to carbon monoxide and a volume of neutral gas containing no more than a small percentage of undecomposed hydrocarbon gas, in a direction of travel counter-current to the prior travel of the heating gas; withdrawing the pyrolyzed gas from the base of the dissociation chamber and recovering the carbon entrained in the gas.

4. The process of obtaining an improved quality of carbon black by the dissociation of hydrocarbon gases and vapors, which comprises heating the interior of a refractory walled chamber having a filling of refractory heat absorbing masses to a temperature sufficient to effect the substantially complete dissociation of hydrocarbon gases to carbon and hydrogen by burning fuel gas in the interior of the chamber, passing the combustion gases through a preheating chamber and bringing its interior to a temperature less than sufficient to effect a substantial dissociation and thence through a heat exchanger; simultaneously, passing air through the heat exchanger and employing it to support the combustion of the fuel gas in the interior of the dissociation chamber; then passing hydrocarbon gases to which have been added a proportion of steam and a volume of neutral gases containing no material proportion of hydrocarbon gas or nitrogen, through the preheating chamber and thence through the dissociation chamber in a direction of travel countercurrent to the prior travel of the heating gases, maintaining a pressure substantially less than atmospheric upon these gases within the preheating and dissociation chambers, withdrawing the pyrolyzed gas from the base of the dissociation chamber and recovering the carbon entrained in the gas.

WILLIAM D. WILCOX.